United States Patent

Reneau

[11] Patent Number: 5,476,291
[45] Date of Patent: Dec. 19, 1995

[54] HOSE COUPLING

[75] Inventor: Phillip G. Reneau, Hamilton, Ind.

[73] Assignee: Winzeler Stamping Company, Montpelier, Ohio

[21] Appl. No.: 327,114

[22] Filed: Oct. 21, 1994

[51] Int. Cl.$^6$ .................................................. F16L 33/20
[52] U.S. Cl. .......................... 285/258; 285/259; 285/328; 285/423; 285/921
[58] Field of Search .............................. 285/98, 281, 328, 285/423, 246, 247, 921, 177, 258, 256, 259, 906

[56] References Cited

U.S. PATENT DOCUMENTS

| 867,108 | 9/1907 | Carmer . | |
|---|---|---|---|
| 1,012,398 | 12/1911 | McCombie | 285/98 |
| 1,977,917 | 10/1934 | Norgren . | |
| 2,251,717 | 8/1941 | Parker | 285/328 X |
| 2,424,863 | 7/1947 | Swain . | |
| 2,880,020 | 3/1959 | Audette . | |
| 3,262,721 | 7/1966 | Knight . | |
| 3,308,998 | 3/1967 | Oppasser et al. . | |
| 3,327,948 | 3/1968 | Arneson | 285/281 X |
| 3,502,355 | 3/1970 | Demler et al. | 285/177 |
| 4,099,744 | 7/1978 | Kutnyak et al. . | |
| 4,152,017 | 5/1979 | Abramson . | |
| 4,310,184 | 1/1982 | Campbell | 285/423 X |
| 4,313,628 | 2/1982 | Duenke | 285/246 X |
| 4,474,392 | 10/1984 | Vassallo et al. . | |
| 4,542,922 | 9/1985 | Grossauer | 285/423 X |
| 4,893,848 | 1/1990 | Melcher | 285/921 X |
| 5,154,453 | 10/1992 | Nishio | 285/423 X |

Primary Examiner—Dave W. Arola
Attorney, Agent, or Firm—Donald R. Fraser

[57] ABSTRACT

A coupling assembly for hoses fabricated of plastic and comprising one-piece male and multi-piece snap together female coupling section. The male section includes an externally threaded fitting and an integral hub adapted to fit over the end of a hose section, the hub having integrally formed ribs or barbs. A ferrule inserted into the hose expands the base all into engagement with the ribs or barbs for securing the section to the hose. The female section includes an annular collar fitted over and secured to the end of a hose section. An annular flange terminating in a forwardly axially extending annular sealing lip is formed on the collar and an internally threaded connector is provided including an inwardly extending annular flange adapted to snap over and engage behind the flange for rotatably mounting the connector on the collar.

3 Claims, 1 Drawing Sheet

HOSE COUPLING

BACKGROUND OF THE INVENTION

1. Field of the Invention

The present invention relates generally to hose couplings and, more particularly, to plastic couplings for the ends of flexible, resilient hoses of the so-called garden hose type.

2. Description of the Prior Art

Garden hoses made of various forms of rubber and plastic compositions are typically provided with so-called male and female end couplings by which the hoses may be readily connected to one another, to faucets or spigots supplying liquid thereto, and to nozzles, sprinklers and the like for dispensing the liquid.

On currently marketed hoses such couplings, which are permanently affixed to the hose ends during production of the hose assembly, are generally of two types. In one, threaded male and female couplers of plastic or brass have a barbed stem which is inserted into the hose end. A clamp member, generally of brass, surrounds the external periphery of the hose and urges it into liquid-tight engagement with the stem. In the other, the threaded male and female couplers, generally of brass or the like, include a tubular sleeve which fits over the outer end of the hose. A ferrule, again of brass or the like, is inserted into the hose end and permanently expanded outwardly to urge the hose into liquid-tight engagement with the tubular sleeve.

The hoses tend to bend most sharply immediately adjacent the coupling during normal use and, after repeated flexing, tend to develop cracks around the coupling until they eventually leak and even break completely off of that point. The metallic components are fabricated of relatively thin sections so that they are easily bent out of shape and permanently deformed by being stepped upon or run over by vehicles. As a result, it may be impossible to couple the hose to an appropriate associated male or female coupling unit or, if it can be so coupled, the joint connection may leak.

Metallic couplings of the aforedescribed types are relatively costly to fabricate and assemble. Both the material itself and the forming process are comparatively expensive. The female units comprise two separate pieces which must be assembled before the coupling is affixed to the hose, thereby complicating the assembly process.

It has been found that the hoses themselves tend to have a longer service life than the prior art original couplings. As a result, replacement couplings have been developed which can be applied to a hose end by the use in place of the original factory applied coupling. One such unit comprises a barbed stem for insertion into the hose, with an external clamp, such as a conventional screw clamp, for securing the hose around the stem. Another, as disclosed in U.S. Pat. No. 4,313,628, typically includes an external sleeve adapted to fit over the end of the hose, with a tapered bushing which threads into the hose and spreads or flares it outwardly against the sleeve. Such replacement couplings have not proven entirely satisfactory in that in either type, due to insertion of a member inside the hose, the diameter is effectively reduced and liquid flow is constricted. The external clamp or tapered internal bushing tends to loosen and allow the coupling to leak and eventually to pull apart. With the tapered insert, the stress is concentrated at the widest portion of the insert during assembly and thereafter, creating an area of likely hose fail.

In another improved hose coupling in U.S. Pat. No. 4,893,848, there is provided a coupling assembly for hoses, fabricated of plastic and comprising basic one-piece male and two-piece female coupling sections. The male section comprises an externally threaded fitting of standard dimensions and an integral coaxial hub adapted to slip over the end of the hose. The hub is provided with internal circumferential barbs of generally sawtooth configuration. The unit may be affixed to the hose end by inserting an expandable ferrule into the end of the hose and permanently deforming the ferrule to expand the hose material into engagement with the barbed interior surface of the hub. Alternatively, a plastic ferrule having external barbs similar to but oppositely directed from those of the hub, may be pressed into the end of the hose to expand it into engagement with the interior surface of the hub.

The female coupling section may comprise a two-piece snap-together unit including an annular collar adapted to slip over the end of the hose and having internal circumferential barbs similar to these of the male section. The annular collar is affixed to the hose end by means similar to those employed with the male section. An annular flange is formed on the collar, and an internally threaded connector is provided for coupling the collar to the male section. The connector has an inwardly turned annular lip adapted to snap over and engage behind the flange on the collar. The barbs are specially configured to bite into the hose material and resist separation of the coupling section from the hose in response to axial forces tending to pull them apart.

In certain instances it has been discovered that the liquid being handled by the hose coupling tends to leak between the internal threads of the annular collar of the female coupling section and the cooperating external threads of the male coupling section.

SUMMARY OF THE INVENTION

In accordance with the present invention, there is provided a one-piece male and a two-piece female coupling sections wherein the annular flange on the collar is caused to terminate axially in a forwardly extending lip adapted to sealingly contact innermost facing annular surface of the male coupling section.

BRIEF DESCRIPTION OF THE DRAWINGS

The above as well as other objects and advantages of the invention will become manifest to one skilled in the art from reading the following detailed description of a preferred embodiment of the invention when considered in the light of the accompanying drawings, in which.

DETAILED DESCRIPTION OF THE PREFERRED EMBODIMENT

Figure 1:
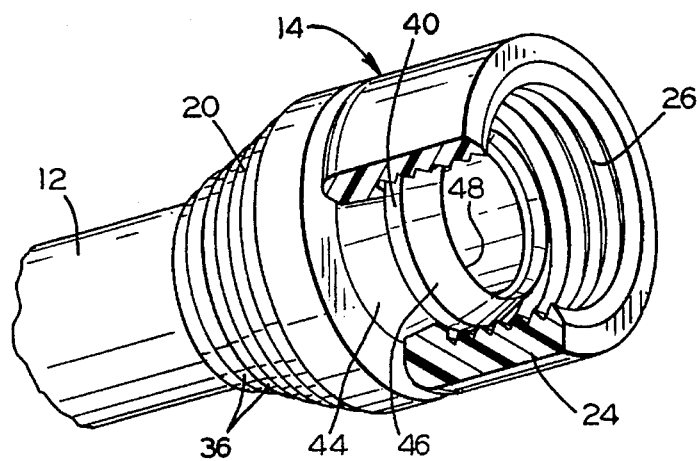
FIG. 1 is a perspective view of a female section of a hose coupling embodying the features of the invention.

Referring now to the drawings, there is illustrated a hose coupling, generally indicated by reference numeral 10, embodying the features of the invention. The hose coupling 10 includes an end segment of a hose 12 to which is affixed a female coupling assembly 14 and a hose end segment 16 having a male coupling section 18 affixed thereto.

The male and female couplings are adapted to be threadably interconnected in the conventional manner. It will be understood that while the male and female sections are illustrated as being connected to one another, the female section may as well be connected to a faucet, spigot, or other source of liquid in the conventional manner while the male section may likewise be connected to a nozzle, sprinkler, or other liquid dispensing device.

Figure 2:
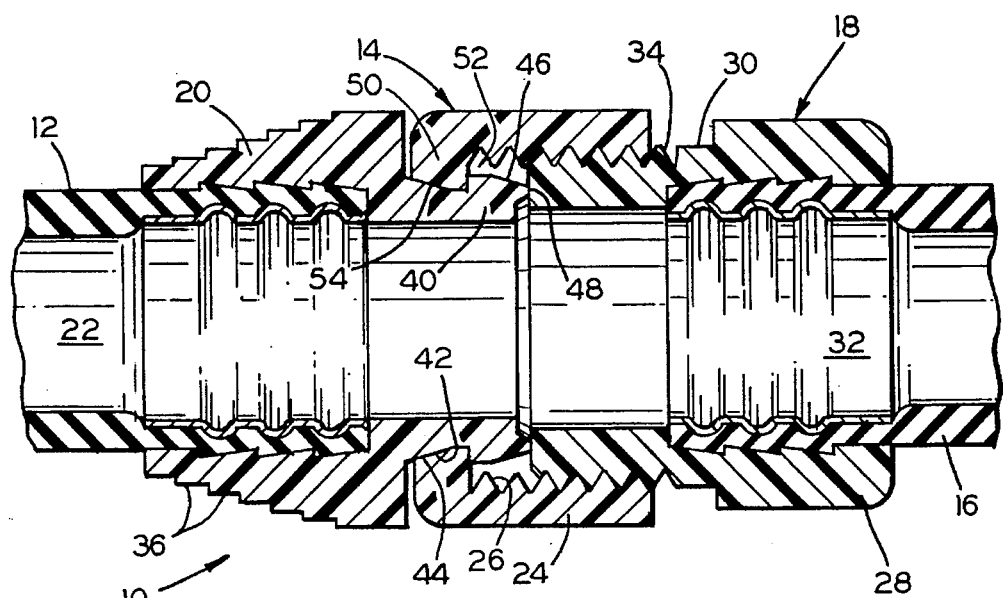
FIG. 2 is a sectional view of a hose coupling incorporating the female section illustrated in FIG. 1 in a coupled position.

As clearly illustrated in FIG. 2, the novel coupling 10 in its preferred embodiment comprises a female coupling assembly 14 of a two-piece, snap together construction, and the male section 18 of a one-piece construction. The female section 14 includes an annular collar 20 having a central bore 22 extending therethrough of a diameter substantially equal to or slightly greater than the external diameter of the associated hose 12 so as to be capable of being readily slipped over the hose end. A tubular connector 24, adapted to snap into place on the annular collar 20, as will be described in greater detail hereinafter, is provided with internal threads 26 for connecting the female section 14 to a corresponding male section 18. The male section 18 includes hub 28 and an integral axially aligned fitting 30 having an axial bore 32 therethrough for receiving the hose end segment 16. The fitting is provided with external threads 34 for mating with the threads 26 of the tubular connector 24 to effectively join the male and female coupling sections together or to other standard fixtures.

The male coupling section 18, annular collar 20, and tubular connector 24 are advantageously formed of a suitable durable but flexible and resilient plastic such as, for example, polypropylene. The female coupling assembly 14 is designed so that, if desired, the annular collar 20 can be first affixed to the hose segment 12, and then the tubular connector 24 can be assembled on the annular collar 20. To that end, the annular collar 20 is formed on its outer surface with a series of spaced annular steps 36 and terminates at its forward end in an annular flange 40 defining a channel 42 therebehind. The channel 42 has a base 44 which slopes forwardly and inwardly for a purpose to be described. The forward corner of the flange 40 is inclined axially inwardly to provide a sloping surface 46 for assisting with the installation of the connector 24. The forwardmost end of the sloping surface 46 terminates in an annular lip 48 which in section is substantially triangular in shape. The annular lip 48 functions as sealing member when the male section 18 is connected with the female section 17 as will be described hereinafter.

The tubular connector 24 is formed at its rear extremity with a radially inwardly extending flange 50 which defines with the threaded portion 26, a recess 52 for receiving the annular flange 40. The flange 50 includes an inwardly facing annular surface 54 having a slope complimentary to the base 44 of the channel 42. Thus, in assembling the female coupling assembly 14, the tubular connector 24 is aligned with and urged against the annular collar 20. Due to the flexible, resilient nature of the material from which the parts are fabricated, the tapered surface 54 of the lip 50 will tend to ride along the sloping surface 46 of the flange 40, causing relative deflection of the lip 50 and the flange 40, until the lip snaps into position within the channel 42 and engage behind the annular flange 40. At the same time, the flange snaps into position within the flange recess 52 and behind the flange 50. The complimentary sloping surfaces 44 and 54, flange 40 and the flange 50 thus coact to lock the collar 20 and the connector 24 against relative axial movement, while freely permitting relative rotational movement.

When the assembly illustrated in FIG. 2 is caused to be in a coupled condition and the tubular connector 24 is rotated in an anticlockwise motion relative to the male coupling 18, the coacting threads 26 and 34 cause the annular sealing lip 48 to contact and form a fluid-tight seal with the terminal annular facing wall of the fitting 30.

Figure 3:
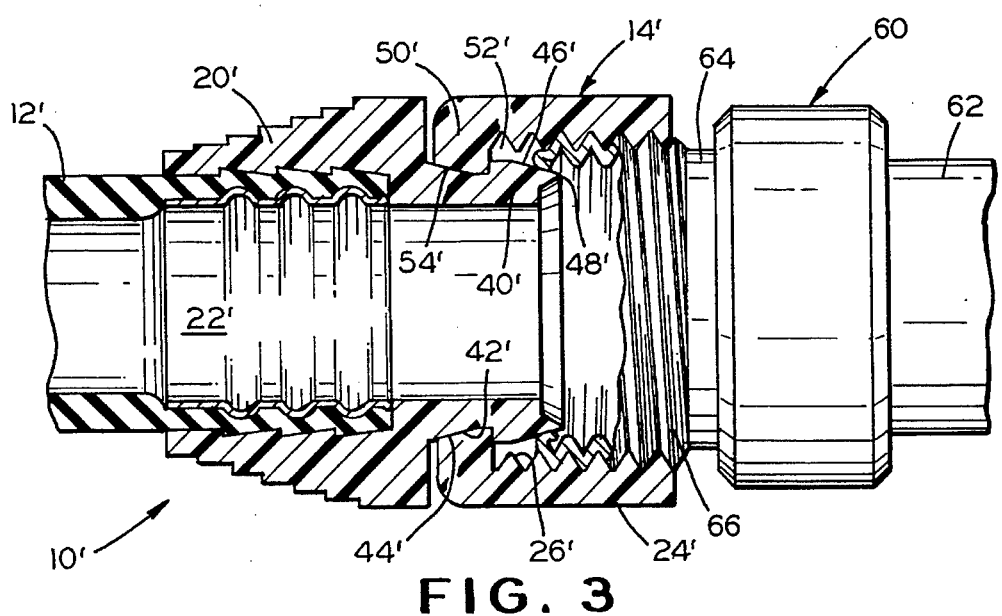
FIG. 3 is a sectional view of another hose coupling incorporating the female coupling illustrated in FIG. 2 and an associated male coupling of the conventional type formed of metal.

In another embodiment of the invention illustrated in FIG. 3 there is shown the same female coupling assembly as illustrated in FIGS. 1 and 2 except that prime reference numerals are used for similar corresponding parts. More specifically, the tubular connector 24' of the female coupling assembly 14' is shown receiving the male coupling assembly 60 of the conventional type having a rubber hose 62 and an associated metal portion 64 terminating in an axially extending section having externally formed threads 66.

When the tubular collar 24' of the female coupling assembly 14' is caused to receive the male coupling assembly 60, the internal threads 26' of the tubular connector 24' threadably engage the external threads 66 of the male coupling assembly 60. As the tubular connector 24' is rotated relative to the male coupling assembly 60, the sloping surface 46' of the annular flange 40' is caused to sealingly enter the internal bore of the end of the metal portion 64 to form a fluid-tight seal therebetween.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. In a coupling member for hoses, a flexible coupling section having a central bore of a diameter substantially equal to the outside diameter of the hose and adapted to fit over the end segment of the hose, the coupling section including:

an annular collar within which annular barbs are formed, said collar including an outwardly extending annular flange defining a channel on one side and terminating in an axially extending sealing lip on the opposite side; and a tubular connection having a central bore therethrough and a threaded portion formed within the central bore at one end thereof and an inwardly directed annular flange at the opposite end thereof, the annular flange adapted to snap-fit over and engage behind the annular flange with the channel of said collar whereby said tubular connection is restrained from relative axial movement on said collar and is adapted to freely rotate relative thereto.

2. A coupling section as defined in claim 1 including a second coupling section comprising a mating coupling section, said second section including a hub with a central bore and having annular barbs formed within said bore, and an integral axially projecting fitting with an externally threaded portion adapted to mate with said internally threaded portion for joining said flexible coupling section and said second coupling section.

3. A coupling section as defined in claim 2 wherein the axially projecting fitting of said second coupling terminates in an annular surface for sealing engagement with the sealing lip of said annular collar of said flexible coupling section.

* * * * *